United States Patent [19]

Maranto et al.

[11] Patent Number: 4,941,727
[45] Date of Patent: Jul. 17, 1990

[54] CRIMPABLE FIBER OPTIC TERMINUS

[75] Inventors: Jack J. Maranto, Capistrano Beach; Norbert L. Moulin, Placentia, both of Calif.

[73] Assignee: Hughes Aircraft Company, Los Angeles, Calif.

[21] Appl. No.: 229,378

[22] Filed: Aug. 5, 1988

[51] Int. Cl.⁵ .............................................. G02B 6/36
[52] U.S. Cl. .............................. 350/96.20; 350/96.21; 350/96.22
[58] Field of Search ................ 350/96.20, 96.21, 96.22

[56] References Cited

U.S. PATENT DOCUMENTS

| 4,411,491 | 10/1983 | Larkin et al. | 350/96.21 |
| 4,447,121 | 5/1984 | Cooper et al. | 350/96.20 |
| 4,573,760 | 3/1986 | Fan et al. | 350/96.21 |
| 4,687,288 | 8/1987 | Margolin et al. | 350/96.20 |
| 4,747,658 | 5/1988 | Borsuk et al. | 350/96.21 X |
| 4,787,699 | 11/1988 | Moulin | 350/96.20 X |
| 4,790,622 | 12/1988 | Levinson et al. | 350/96.20 |

Primary Examiner—John D. Lee
Assistant Examiner—Phan T. Heartney
Attorney, Agent, or Firm—Joseph E. Szabo; Wanda K. Denson-Low

[57] ABSTRACT

A fiber optic terminus (11) comprising a body (13) having a passage (43) therein and a longitudinally compressible and radially expandable coupling element (15) in the passage. The coupling element (15) has a passage (60) therein adapted to receive a portion of an optical fiber (23). An axial force is applied to the coupling element (15) by a plunger (17) and a spring (19). The coupling element (15) is compressed axially and expanded radially to retain the optical fiber (23) in the passage (60) of the coupling element.

12 Claims, 1 Drawing Sheet

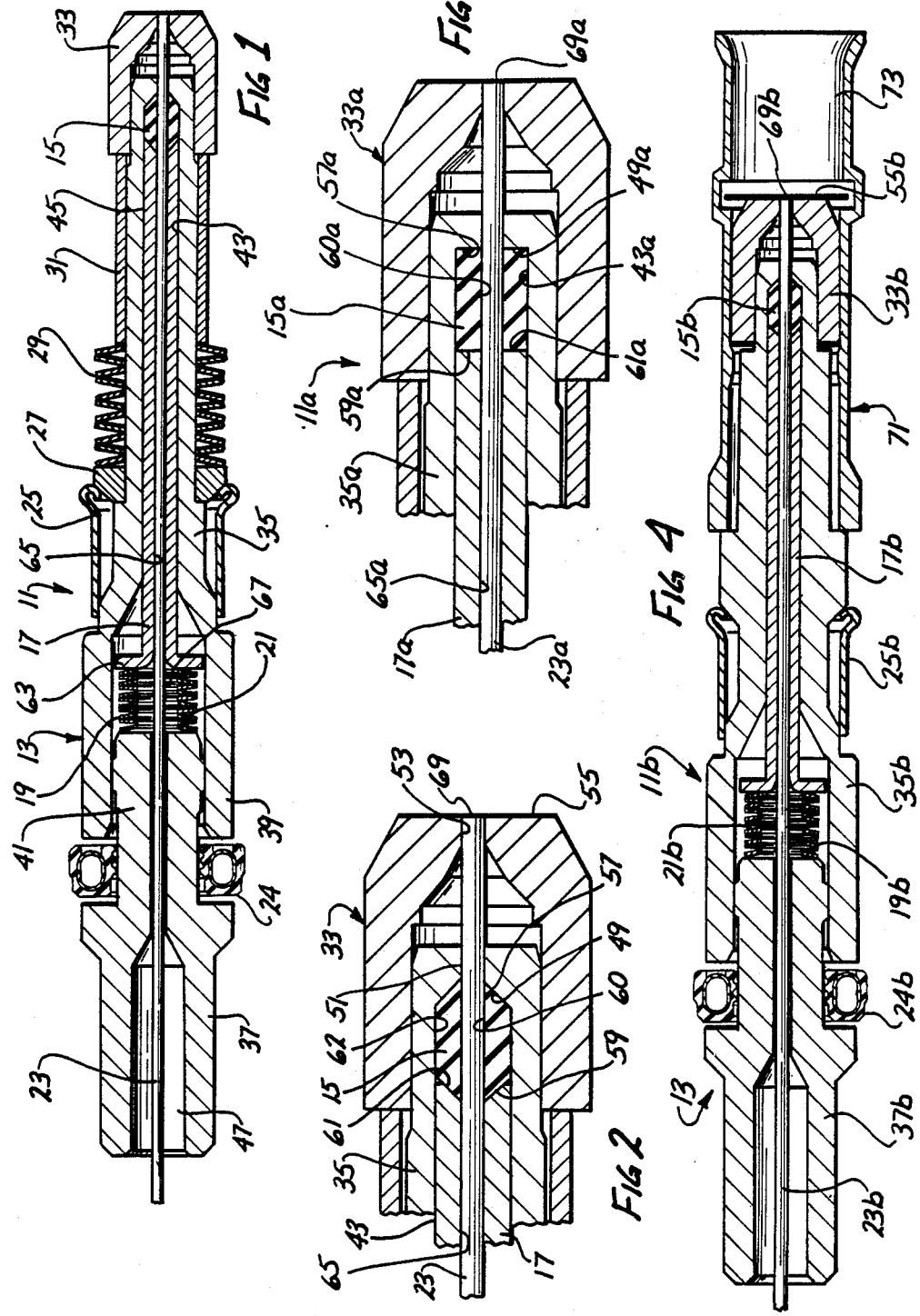

CRIMPABLE FIBER OPTIC TERMINUS

BACKGROUND OF THE INVENTION

1. Field of the Invention

This invention relates to a fiber optic terminus, and more particularly, to a novel construction and method for securely holding an optical fiber in the fiber optic terminus.

2. Description of Related Art

It is conventional practice to couple optical fibers utilizing a fiber optic pin terminus and a fiber optic socket terminus. Separate optical fibers are carried by the pin terminus and the socket terminus. A portion of the pin terminus is receivable in the socket terminus to optically couple the optical fibers.

It is important that optical fibers be coupled in a manner to minimize optical losses at the interface between fibers. This requires that the fibers be accurately axially aligned, and this is particularly difficult because optical fibers are typically of very small diameter. In any event, it is important to accurately and tightly secure the fibers to the associated terminus to assist in minimizing optical losses.

It is known to use an adhesive to attach optical fibers to a terminus. However, the adhesives commonly used for this purpose usually require curing time and have a limited shelf life. Adhesives tend to be messy and are not well suited for use in the field.

Another technique of affixing an optical fiber to a terminus is to radially crimp the metal of the terminus at the attachment site such that the optical fiber is radially clamped. This can produce regions of concentrated or high pressure on the optical fiber even if a relatively ductile material, such as lead, is interposed between the optical fiber and the body of the terminus. The regions of relatively high pressure can produce microbends in the fiber, and this condition produces optical losses. In addition, if the terminus is subjected to widely fluctuating temperatures, the radial crimping forces acting on the fiber will increase and then decrease during temperature swings. This may cause the fiber to loosen, or at the other extreme, to be subjected to excessive pressure and the related risks of microbending.

Common assignee's copending application Ser. No. 091,932 filed on Sept. 1, 1987 discloses a fiber optic terminus which employs a temperature-activated adhesive to adhere an optical fiber in the passage of a fiber optic terminus. The adhesive is flowable when its temperature is raised to a predetermined level. Consequently, the design does not lend itself to high-temperature applications where the ambient temperature consistently exceeds that at which the adhesive is activated, i.e., becomes flowable.

SUMMARY OF THE INVENTION

This invention provides a fiber optic terminus and method which overcome the disadvantages and temperature limitations noted above. This invention eliminates the radial crimping technique with its accompanying disadvantages. And although adhesive can be used with this invention if desired, no adhesive is necessary, and accordingly, the limitations accompanying the use of adhesives ma also be eliminated.

This invention uses a force acting generally longitudinally of the optical fiber to create the desired retaining force on the fiber. This longitudinal force is converted to a radial force acting on the fiber to appropriately retain the fiber in the terminus. Moreover, according to a preferred feature of the invention, this radial force is applied smoothly and evenly completely around the fiber and for a defined axial length of the fiber. Accordingly, the regions of relatively high or concentrated pressure, which result from the radial crimping technique of the prior art, are substantially or completely eliminated.

This invention employs a coupling element for converting the longitudinal force into a radial force acting against the optical fiber. Although the coupling element can be of any construction that will accomplish this, it preferably has a passage therein adapted to receive a portion of the optical fiber and is compressible longitudinally and expandable radially. The force acting longitudinally of the compressible element compresses the compressible element longitudinally and expands the compressible element radially. The radial expansion of the compressible element includes expansion radially inwardly to constrict the passage of the coupling element so that the coupling element radially grips the fiber to securely retain it.

The coupling element is deformable and is preferably resiliently deformable so that the coupling element has compliance when forces are applied due to thermal expansion. The coupling element is constructed of a material which, when under pressure, acts much like a liquid in that its volume undergoes essentially no change and its shape is altered due to flow of material. Accordingly, a coupling element having these characteristics applies an essentially hydraulic load completely around a length of the optical fiber and a hydraulic type load is inherently devoid of any significant regions of concentrated or high pressure. This further reduces the likelihood of inducing microbends into the fiber. The coupling element is not temperature activated, need not contain, and is preferably not, an adhesive and is longitudinally compressible at normal ambient temperatures. Although the coupling element may be constructed of an easily deformable metal such as indium or a suitable deformable plastic, an elastomer such as rubber is presently preferred.

The passage in the coupling element is preferably linear, although this is not required. Whether or not the passage is linear, the force acting on the coupling element will act generally longitudinally of at least a region of the passage through the coupling element. One or more passages can be provided in the coupling element to hold a corresponding number of optical fibers.

The coupling element can advantageously be incorporated into a fiber optic terminus which includes a body having a passage therein and means for applying the longitudinal force through the coupling element. The coupling element is positioned in the passage of the body.

The force applying means preferably, although not necessarily, includes a resilient means, such as a resilient member, for applying the longitudinal force to the coupling element. The resilient means partially compensates for the thermal expansion and contraction that accompanies wide fluctuations in temperature and the use of components having different coefficients of expansion by keeping the longitudinal force acting on the coupling element substantially less variable than if the resilient means were not employed. This tends to assure that the gripping forces will not become too large or too small even if the terminus is subjected to widely fluctuating temperatures.

In a preferred construction, the force applying means also includes a plunger in the passage of the body. The plunger can be used to transmit the force from the resilient member to the coupling element, and if the plunger engages the coupling element, it helps capture the coupling element.

When the coupling element is longitudinally compressed, it tends to expand radially outwardly and radially inwardly. To assure that a sufficient and controllable amount of radial inward expansion takes place and to assist in locking the coupling element in the body of the terminus, the coupling element is preferably confined in a zone radially outwardly of the coupling element. This is preferably accomplished by the wall which defines the passage of the body, with such wall limiting the radial outward expansion of the coupling element.

Although the body of the terminus can be of various different constructions, it can advantageously include first and second body sections appropriately coupled together as by a force fit. When this construction is employed, the coupling element is in the first body section and the resilient member preferably acts between the second body section and the plunger.

According to the method of this invention, the coupling element is provided in the passage of the body of the terminus. The longitudinal force is then applied to the coupling element at substantially ambient temperature to constrict the passage of the coupling element so that the coupling element retains the optical fiber in the passages of the coupling element and the body.

The invention, together with additional features and advantages thereof may best be understood by reference to the following description taken in connection with the accompanying illustrative drawing.

BRIEF DESCRIPTION OF THE DRAWING

FIG. 1 is an axial sectional view of a fiber optic pin terminus constructed in accordance with the teachings of this invention.

FIG. 2 is an enlarged, fragmentary, sectional view of a distal end portion of the fiber optic pin terminus.

FIG. 3 is an enlarged, fragmentary, sectional view similar to FIG. 2 showing a coupling element and pocket of alternate construction.

FIG. 4 is an axial sectional view similar to FIG. 1 of a fiber optic socket terminus constructed in accordance with the teachings of this invention.

DESCRIPTION OF THE PREFERRED EMBODIMENTS

FIGS. 1 and 2 show a fiber optic pin terminus 11 which generally comprises a body 13, a coupling element 15, and force applying means, which includes in this embodiment a plunger 17, a resilient member in the form of a spring 19 and a surface or abutment 21 on the body for use in compressing the spring. The pin terminus 11 is adapted for use with an optical fiber 23 of conventional construction. The pin terminus 11 also includes a seal 24, retaining clip 25, a rear spring spacer 27, a belleville spring 29 seated on the spacer 27, a front spring spacer 31 engaging the other end of the spring 29 and an end guide bushing 33 engaging the other end of the spacer 31. The members 24, 25, 27, 29, 31 and 33 are all tubular and conventional and are mounted on the body 13 in a conventional manner.

The body 13 includes tubular body sections 35 and 37. The body section 35 has a socket end portion 39 which receives a plug end portion 41 of the body section 37 with a force fit sufficient to securely attach the body section 37 to the body section 35.

The body 13 has an axial passage 43 extending completely through it and such passage is defined by axially aligned bores 45 and 47 in the body sections 35 and 37, respectively.

As best seen in FIG. 2, the body section 35 has a conical wall 49. One advantage of this construction is that the natural configuration of the end surface 49 is conical when the passage 43 is formed in a boring operation. The passage 43 has a coaxial exit section 51 of reduced diameter. The bushing 33 is suitably retained on the distal end of the body section 35 as by a press fit and has an orifice 53 coaxial with the passage 43 and a planar end face 55.

The coupling element 15 in this embodiment is constructed of a resilient material, such as rubber, and has, in its relaxed or unstressed state, conical end surfaces 57 and 59. The end surface 57 mates with the conical wall 49. Thus, the coupling element 15 is positioned in a distal end portion of the passage 43. The coupling element 15 has a passage 60 extending axially through it, and such passage is coaxial with the passage 43 and the orifice 53. In this embodiment the passage 60 is linear.

Although the plunger 17 can be of various different configurations, in this embodiment it is in the form of an elongated tube moveable in the passage 43 and engageable with the coupling element 15. In this embodiment, the plunger 17 has a conical distal end wall 61 which mates with the conical end surface 59 of the coupling element 15. Thus, the end wall 61 cooperates with the conical wall 49 and a region of a peripheral wall 62 of the passage 43 to define a pocket for the coupling element 15. The plunger 17 has an integral circumferentially extending flange 63 at its proximal end. The flange 63 is in the socket end portion 39. The plunger 17 has an axial passage 65 extending completely through it. The passage 65 is axially aligned with the passage 60 of the coupling element 15, and preferably, both of these passages are cylindrical.

Although the spring 19 can be of various different constructions, in this embodiment it is in the form of a plurality of belleville washers. The spring 19 is in the socket end portion 39 and, in this embodiment, bears directly against the flange 63 of the plunger 17 and the abutment 21. Although the abutment 21 can be provided in different ways, in this embodiment it is the distal end face of the body section 37. The spring 19 has a large central opening in registry with the bore 47 and the passage 65 of the plunger 17.

In use, the optical fiber 23 is inserted through the bore 47, the opening 67, the passages 65 and 60, the exit section 51 and the orifice 53. This occurs with the plug 41 partly preassembled into the socket end portion 39, but with the spring 19 uncompressed. Next, the body sections 35 and 37 are pushed together to move the plug end portion 41 into the socket end portion 39 to the position shown in FIG. 1. This compresses the spring 19, and the spring force is transmitted through the plunger 17 to the coupling element 15. This applies a force to the coupling element 15 which acts longitudinally, and in this embodiment axially, of the passage 60 through the coupling element. The steps described above can be carried out at normal ambient temperatures. Because the coupling element 15 is compressible as described above, the application of this axial force axially compresses the coupling element between the walls 49 and 61. This in turn radially expands the coupling element 15 to constrict the passage 60 such that the coupling element 15 tightly and evenly applies a gripping force to the optical fiber 23 completely around the fiber and over a length of the fiber equal to the length of the coupling element.

The peripheral wall 62 of the passage 43 confines the coupling element 15 in a zone radially outwardly of the coupling element to thereby limit the radial outward expansion of the coupling element and assure that a predictable and desired degree of the expansion takes place radially inwardly to constrict the passage 60. This securely retains the optical fiber in the passage 60 of the coupling element, and because the coupling element is securely retained within the passage 43 between the walls 49 and 61, the optical fiber is also securely retained in the passage 43 of the terminus 11.

The spring 19 assures that substantial axial force will be applied to the coupling element 15 and that this force will not unduly fluctuate even with wide temperature variations and significantly different coefficients of expansion of the several components of the terminus 11. With the fiber 23 securely affixed to the terminus 11, it can be cut and polished as desired in accordance with conventional techniques to provide a distal end 69 (FIG. 2) which is flush with the face 55 of the bushing 33. An adhesive can be used, if desired, to affix the fiber 23 in the bushing 33 so that the fiber will not move radially in the orifice 53.

FIG. 3 shows a fiber optic pin terminus 11a which is identical to the pin terminus 11 in all respects not shown or described herein. Portions of the pin terminus 11a corresponding to portions of the pin terminus 11 are designated by corresponding reference numerals followed by the letter a.

The only differences between the pin termini 11 and 11a are in the configuration of the coupling element 15a and the configurations of the walls 49a and 61a. Specifically, in the unstressed condition the coupling element 15a is cylindrical and has flat, circular end surfaces 57a and 59a perpendicular to the axis of the passage 60. Similarly, the walls 49a and 61a are circular and perpendicular to the axis of the passages 65a and 43a, respectively, and because the passages 65a and 43a are coaxial, the walls 49a and 61a are parallel. One advantage of this construction is that the coupling element 15a can be cut from an elongated extruded tube to achieve an economy in manufacture.

FIG. 4 shows a fiber optic socket terminus 11b which is identical to the fiber optic pin terminus 11 in all respects not shown or described herein. Portions of the pin terminus 11 corresponding to portions of the socket terminus 11b are designated by corresponding reference numerals followed by the letter b.

The only difference between the termini 11 and 11b is that the latter is a socket terminus and is adapted to receive a portion of the pin terminus 11. Structurally the only differences are that the terminus 11b does not have the spacer 27, the spring 29, and the spacer 31. Rather, the terminus 11b has a conventional alignment sleeve 71 mounted on the body section 35b and the bushing 33b, with a region of the sleeve 71 extending distally beyond the face 55b to form a socket 73 which is adapted to receive the bushing 33 of the pin terminus 11 to thereby couple the fibers 23 and 23b. Accordingly, the features of this invention are equally applicable to both pin and socket termini, and the features of FIG. 3 are also applicable to the socket terminus 11b.

Although exemplary embodiments of the invention have been shown and described, many changes, modifications and substitutions may be made by one having ordinary skill in the art without necessarily departing from the spirit and scope of this invention.

What is claimed is:

1. A fiber optic terminus comprising:
   a body having a passage therein;
   an elastomeric coupling element confined in said passage, said coupling element having a passage adapted to receive a portion of the optical fiber;
   said coupling element being resiliently deformable to constrict said passage of the coupling element by expanding radially and compressing axially in response to a force on the coupling element acting generally longitudinally of at least a region of the passage through the coupling element; and
   means including a resilient member for applying said force to the coupling element so as to cause the coupling element to translate at least a portion of said force to said optical fiber and thereby frictionally grip said fiber in the passage of the coupling element.

2. A fiber optic terminus as defined in claim 1 wherein the coupling element comprises a rubber plug having an axial passage extending therethrough.

3. A fiber optic terminus as defined in claim 1 including means for confining the coupling element in a zone radially outwardly of the coupling element.

4. A fiber optic terminus as defined in claim 1 wherein said means for applying includes a plunger movable in the passage of the body and engageable with the coupling element.

5. A fiber optic terminus as defined in claim 4 wherein the body includes first and second body sections, said coupling element is in said first body section and said a resilient member acts between the second body section and the plunger.

6. A fiber optic terminus as defined in claim 1 wherein the passage in the coupling element is substantially linear and extends completely through the coupling element.

7. A fiber optic terminus comprising:
   a body having a passage therein;
   an elastomeric coupling element in said passage, said coupling element having a passage extending through the coupling element and being compressible longitudinally of the passage therein and expandable radially of the passage therein;
   an optical fiber in said passage of the body and extending through the passage of the coupling element;
   means for applying a force to the coupling element longitudinally of the passage therein to longitudinally compress and radially expand the coupling element whereby the coupling element tightly grips the optical fiber; and
   said means for applying including a plunger nad a resilient member.

8. A fiber optic terminus as defined in claim 7 wherein the passage of the body is defined by a wall and said wall limits the radial outward expansion of the coupling element.

9. A fiber optic terminus as defined in claim 7 wherein the body includes first and second body sections, said coupling element is in said first body section and said resilient member acts between the second body section and the plunger.

10. A method of retaining an optical fiber in a passage of a body comprising:

providing an elastomeric coupling element confined in the passage of the body, with the coupling element having a passage which receives a portion of the optical fiber and with the passage of the coupling element being resiliently constrictable in response to a force on the coupling element acting generally longitudinally of at least a region of the passage through the coupling element; and applying said force to the coupling element through a resilient member at substantially ambient temperature to resiliently constrict the passage of the coupling element so that the coupling element tightly grips the optical fiber in the passages of the coupling element and of the body under the urging of said force.

11. A method as defined in claim 10 wherein the coupling element is compressible and said step of applying compresses the coupling element generally longitudinally of said region of the passage and expands the coupling element generally radially at said region to constrict the passage through the coupling element.

12. A method as defined in claim 11 wherein said step of applying is carried out while confining the coupling element in a zone radially outwardly of the coupling element.

* * * * *